United States Patent
Popescu-Stanesti

(10) Patent No.: US 6,246,215 B1
(45) Date of Patent: Jun. 12, 2001

(54) BUFFER BATTERY POWER SUPPLY SYSTEM

(75) Inventor: Vlad Popescu-Stanesti, San Jose, CA (US)

(73) Assignee: O2 Micro International Limited, Grand Cayman (KY)

(*) Notice: Subject to any disclaimer, the term of this patent is extended or adjusted under 35 U.S.C. 154(b) by 0 days.

(21) Appl. No.: 09/272,738

(22) Filed: Mar. 8, 1999

(51) Int. Cl.[7] .................................................. H02J 7/04
(52) U.S. Cl. ............................................ 320/139; 320/141
(58) Field of Search .................................. 320/139, 141, 320/143, 145

(56) References Cited

U.S. PATENT DOCUMENTS

| | | | |
|---|---|---|---|
| 4,472,672 | * 9/1984 | Pacholok | 320/145 |
| 4,476,425 | * 10/1984 | Chernotsky et al. | 320/143 |
| 4,849,682 | * 7/1989 | Bauerbet | 320/106 |
| 5,142,215 | * 8/1992 | Mathison | 320/141 |
| 5,166,595 | * 11/1992 | Leverich | 320/139 |
| 5,187,425 | 2/1993 | Tanikawa | 320/138 |
| 5,204,611 | * 4/1993 | Nor et al. | 320/145 |
| 5,272,382 | 12/1993 | Heald et al. | 307/66 |
| 5,465,039 | 11/1995 | Narita et al. | 320/164 |
| 5,585,749 | 12/1996 | Pace et al. | 327/108 |
| 5,696,435 | * 12/1997 | Koenck | 320/145 |
| 5,698,964 | 12/1997 | Kates et al. | 320/125 |
| 5,723,970 | 3/1998 | Bell | 320/140 |
| 5,726,554 | 3/1998 | Freiman et al. | 320/139 |
| 5,736,831 | 4/1998 | Harrington | 320/148 |
| 5,786,685 | 7/1998 | Lange et al. | 323/270 |
| 5,998,968 | * 11/1999 | Pittman | 320/130 |

* cited by examiner

*Primary Examiner*—Edward H. Tso
*Assistant Examiner*—Pia Tibbits
(74) *Attorney, Agent, or Firm*—Hayes, Soloway, Hennessey, Grossman & Hage PC

(57) ABSTRACT

A buffer battery power supply circuit is provided. In one embodiment, a battery charger circuit supplies a total output current which is delivered to both an active system and a battery. The total output current and the current delivered to a battery are sensed and compared to a preset threshold total output current signal and threshold battery current signal, respectively. The compared signals generate error signals which are provided as feedback to the battery charger circuit, so that the total output current can be controlled. In another embodiment, in addition to sensing the total output current and the battery current, the total output voltage is sensed and multiplied by the total output current, generating a total output power error signal. The error signals are provided as feedback to the battery charger circuit, so that the total output current and/or the total output voltage can be controlled.

28 Claims, 7 Drawing Sheets

BUFFER BATTERY POWER SUPPLY SYSTEM

BACKGROUND OF THE INVENTION

1. Field of the Invention

The present invention relates to a battery power supply system, and, more particularly, to a buffered battery charger circuit capable of controlling the power supplied to an active system and to a rechargeable battery. Particular utility of the present invention is in a power supply system for portable electronic units; although other utilities are contemplated herein.

2. Description of Related Art

FIG. 1 is a simplified block schematic of a typical prior art power supply topology 20 for a portable electronic system 24. The active system 24 gets power, conditioned by the system DC/DC converter 22, either from the battery 18 or from the external input power adapter 10. The input power adapter 10 gets the power from an external primary power source, such as an AC outlet or a DC source, and provides the power directly to both the system DC/DC converter 22, through the separating diode 12, and to the battery charger 14. The battery 18 is connected and provides power to the system DC/DC converter 22 through the separating diode 16, as long as the primary power source is not available. When the primary power source is available, the battery is isolated from the power input of the system DC/DC converter 22 by the reversed polarized (reversed biased) diode 16. In addition, the battery 18 is charged when power is supplied by the primary power source, through the charger 14. This topology in FIG. 1 has the disadvantage of big and fast voltage transients at the node 25, which is the input of the system DC/DC converter 22.

FIG. 2 shows a simplified block diagram of a buffer battery power supply 20' topology. The battery pack 18 is permanently connected to the input of the system DC/DC converter 22 and provides the requested power. The external input power adapter 10 powers the battery charger 14 when an external primary power source is available. The external input power adapter 10 is intended to adapt the parameters of the primary source to the charger input requirements. The battery charger 14 powers in parallel both the system DC/DC converter 22 and the battery 18 to charge it or to maintain the voltage of the fully charged battery at the optimal level. This "buffer battery topology" limits the voltage variations at the system DC/DC converter input (node 25) to normal battery pack voltage variations and does not allow fast voltage transients at this input. Furthermore, when the power requested by the system 24 temporarily exceeds the capability of the input power adapter 10, both the input power adapter 10 and the battery 18 will deliver in parallel the power to the system 24 through the converter 22. Disadvantageously, however, the circuit 20' shown in FIG. 2 provides no mechanism by which the power supplied by the battery charger can be reduced or increase based on preset limits or demand from the battery, the system, or both.

Similarly, U.S Pat. No. 5,698,964 issued to Kates et al. provides a battery charging circuit topology. This circuit monitors the current from an AC adapter (i.e., $I_{in}$) and adaptively utilizes all available current to charge the batteries. The system DC/DC converter is powered directly by the AC adapter after its connection; the battery is disconnected from the system. Thus the voltage at the input of the system DC/DC converter abides a heavy transient, from the low voltage of a discharged battery to the AC adapter voltage, every time higher than the maximum charged battery voltage. Furthermore, as the AC adapter output voltage could vary, no real control is provided for the power delivered by the AC adapter to both the system (e.g. portable electronic device) and the battery. A similar topology is provided in U.S. Pat. No. 5,723,970 issued to Bell, which suffers similar and for additional drawbacks mentioned above.

Thus, there exists a need to provide a buffered battery power supply system that can control both the total output power and the power delivered to the battery. Moreover, there exists a need to provide a system that will significantly reduce the voltage transients that may appear at the electronic device, the battery, or both.

SUMMARY OF THE INVENTION

Accordingly, the present invention solves the aforementioned drawbacks by providing a buffer battery power supply system that includes feedback control of both the total output current delivered by the battery charger circuit and the voltage delivered to the battery. In addition, feedback control is provided based on the total output power (total output current×total output voltage) delivered by the battery charger circuit.

In one embodiment of the present invention, a power supply system is provided that includes a charger circuit for generating a duty cycle for delivering power to an active system and a battery. A first feedback loop is provided to sense the total output current generated by the charger circuit and a second feedback loop is provided to sense the current delivered to said battery by the charger circuit. The first and second feedback loops including error circuits for generating an error signal to the charger circuit. The charger circuit adjust the duty cycle so thereby controlling the total output current delivered to the active system and the battery based on the value of the error signal.

In another embodiment of the present invention, a power supply system is provided that includes an input power source, and a charger circuit for generating a duty cycle for controlling the input power source to deliver controlled power to an active system and a battery. A first feedback loop is provided to sense the total output current generated by the charger circuit, the first feedback loop generating a first error signal based on the total output current and a preset threshold total output current signal. A second feedback loop is provided to sense the current delivered to the battery by the charger circuit, the second feedback loop generating a second error signal based on the current delivered to the battery and a preset threshold battery current signal. A third feedback loop is provided for sensing the total output power generated by the charger circuit, the third feedback loop generating a third error signal based on the total output power and a preset threshold total output power signal. Using the first, second or third error signals, the charger circuit adjusts the duty cycle for controlling the total output current and power delivered to the active system and the battery.

In method form, the present invention provided a method of regulating the current delivered by a charger circuit to an active system and a battery. The method includes the steps of sensing a first error signal based on the total output current of the charger circuit and a preset threshold total output current signal. The method also includes sensing a second error signal based on the current delivered to the battery by the charger circuit and a preset threshold battery current signal. One of the first or second error signals is provided to the charger circuit as feedback signals. The charger circuit adjusts the current delivered based on the first or second feedback error signals.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF PREFERRED EMBODIMENTS

Figure 1:
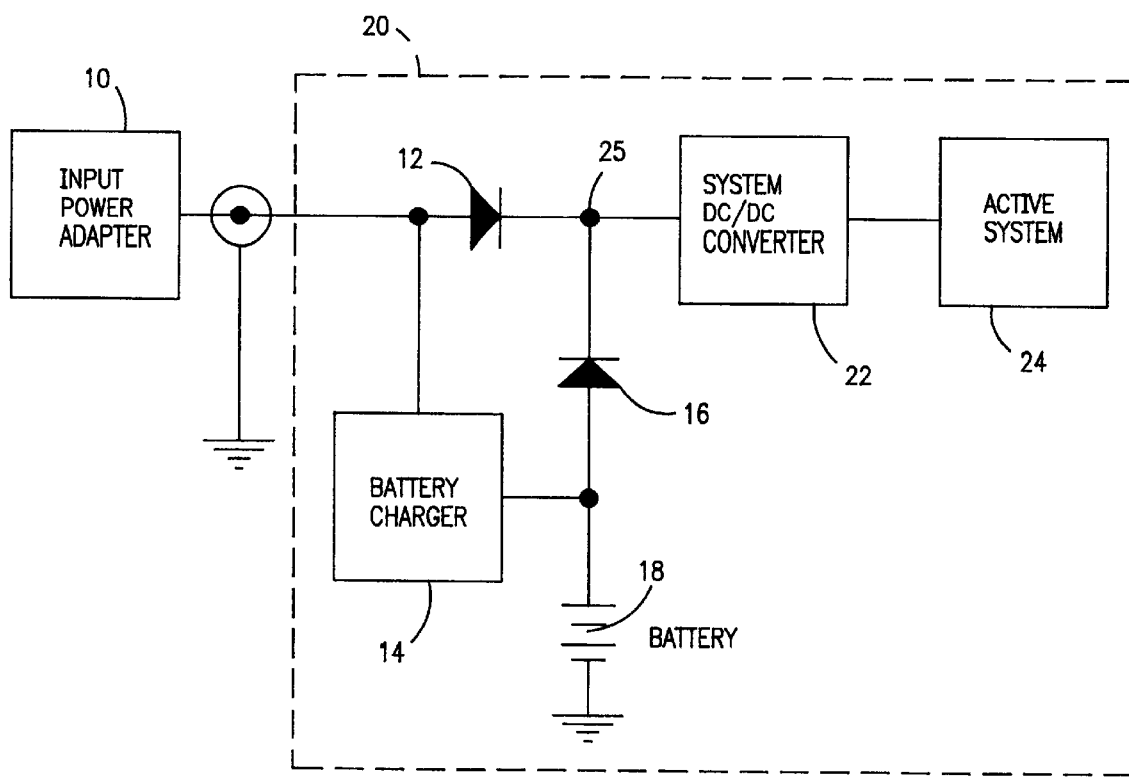
FIG. 1 is a block diagram of a power supply circuit topology of the prior art.
Figure 2:
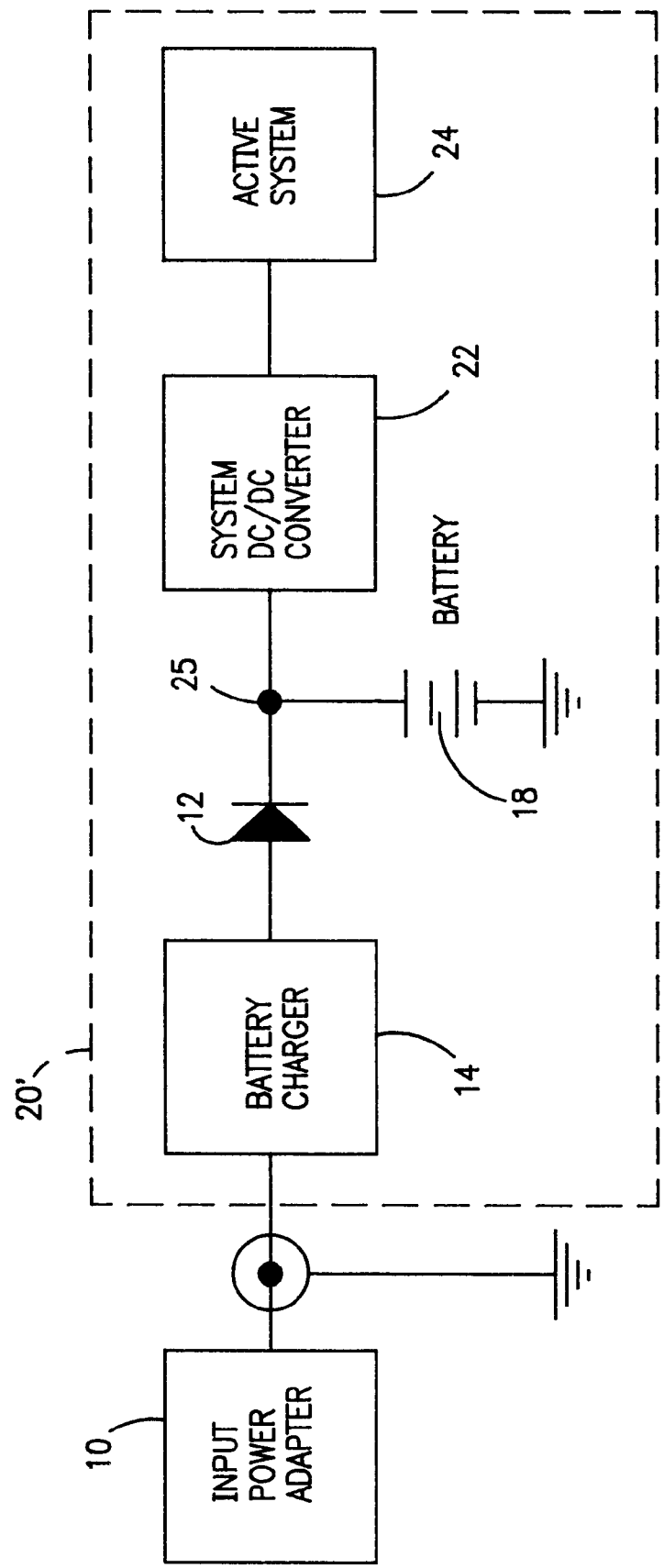
FIG. 2 is block diagram of another power supply circuit topology of the prior art.
Figure 3:
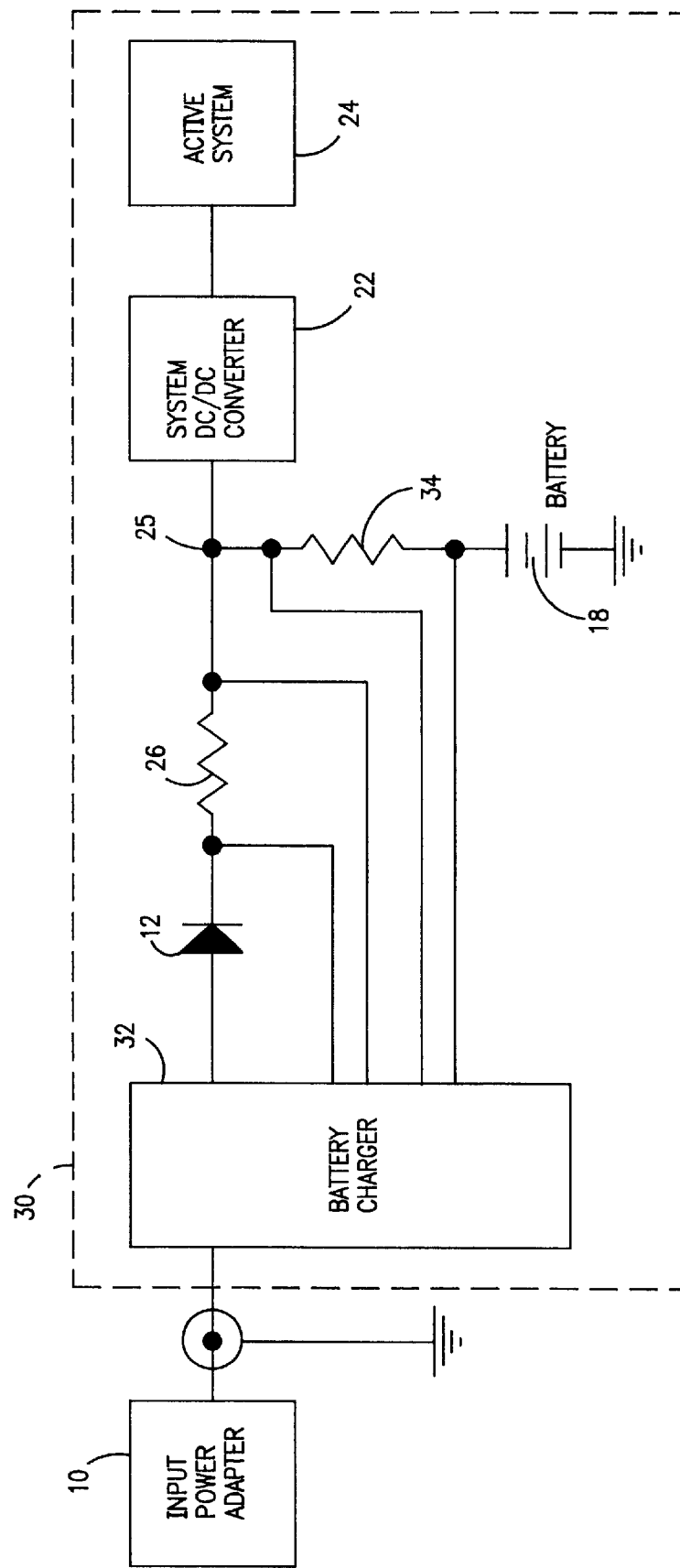
FIG. 3 is a block diagram of one preferred embodiment of the power supply system of the present invention.

FIG. 3 shows the block diagram of one preferred embodiment of the battery power system 30 according to the present invention. The battery pack 18 is, as discussed above, permanently connected to the system DC/DC converter through the sense resistor 34. Preferably, resistor 34 is a very small value resistor is intended to sense the current to and from the battery 18, with negligible voltage drop. The battery charger 32 is connected to the system DC/DC converter input (node 25) through the separating diode 12 and the sense resistor 26. When the input power adapter 10 has a primary power source available and it is connected to the system 30, the battery charger 32 provides the requested power to the active system 24 trough the DC/DC converter 22, and simultaneously charges the battery 18. The battery charging current, sensed by the sense resistor 34, and the voltage on the node 25 are regulated by the battery charger 32, which makes use of feedback connections from the current sense resistor 34 and from the node 25. Furthermore, the total battery charger output current is sensed by sense resistor 26 and is limited to a safe value by using the feedback connections from the sense resistor 26 to the battery charger 32, The battery charger 32 reacts by reducing the charging current. The feedback connection via sense resistors 26 and 34 are described in more detail below.

Figure 4:
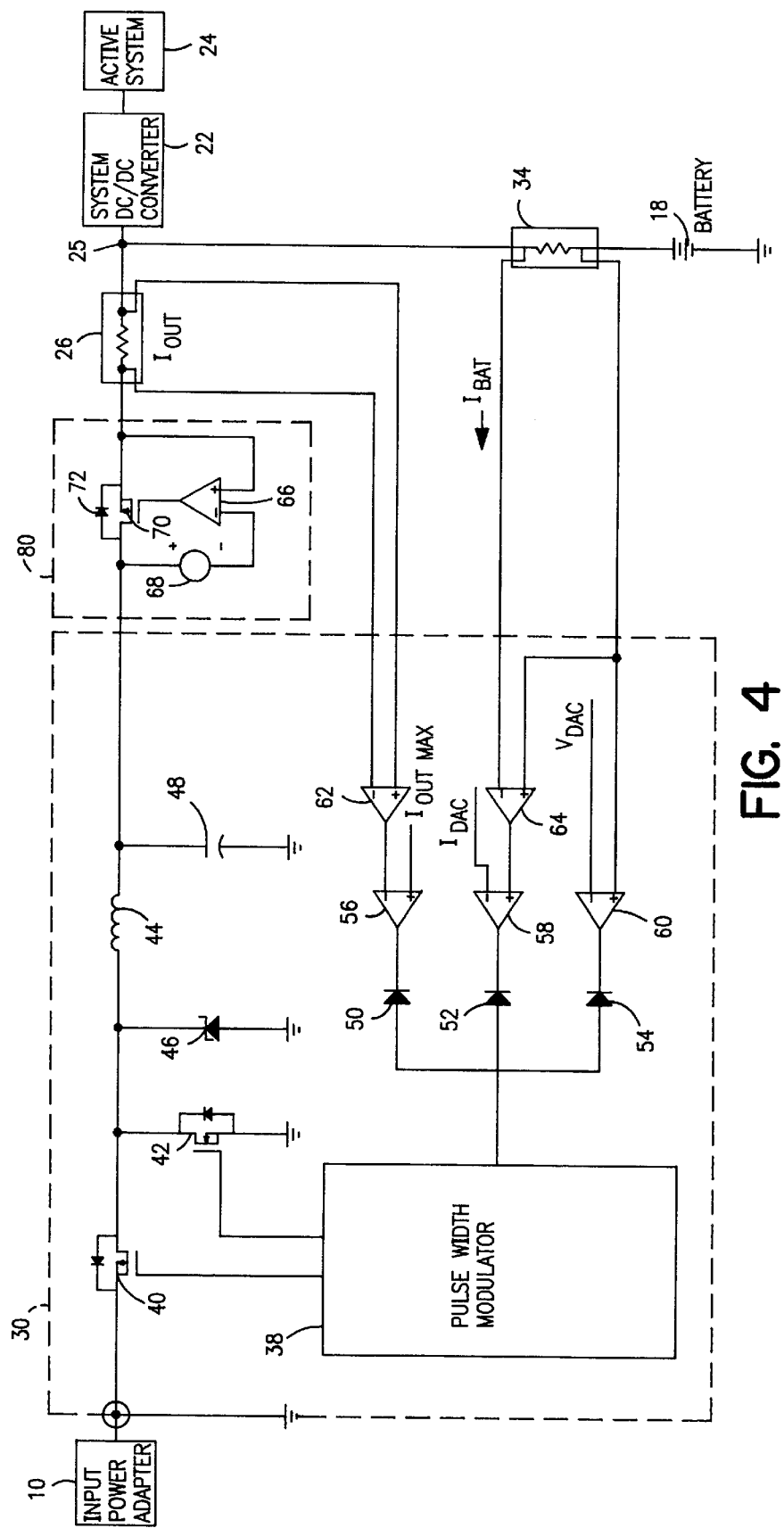
FIG. 4 is a detailed circuit diagram of the embodiment of FIG. 3.

Referring to the FIG. 4, a detailed circuit diagram of the battery charger circuit 32 according to one embodiment of the present invention is depicted. The switching MOS transistors 40 and 42, the Schottky diode 46, the inductor 44, the capacitor 48 and the pulse width modulator 38 together form a controlled buck converter. In this embodiment, the duty cycle of the buck converter pulses is controlled by the pulse width modulator 38 through at least three feed back loops: I) a voltage loop built around the error amplifier 60, II) a battery charging current loop using the battery charging current sense amplifier 64 and the error amplifier 58, and III) a total output current limiting loop embedding the output current sense amplifier 62 and the comparator 56. The diodes 50, 52 and 54 assure the largest negative value (i.e., the diode having the largest reverse bias) goes through to the PWM 38. This is a measure of the largest error, thus providing control of that output parameter which had reached the limit value.

When the input power adapter 10 provides power to the charger input, the pulse width modulator 38 starts to generate pulses which drive the gates of power MOS transistors 40 and 42. As a result a voltage appears on the output of the charger. The duty cycle of the pulses depends on the feed back voltage received by the PWM 38 from the feed back loops. As long as no one of the set limits is exceeded, the duty cycle increases, which in turn raises the output voltage of the buck converter. The set limits are preferably defined as preset inputs to the comparators, as discussed below. When the output voltage of the buck converter exceeds the battery voltage, the circuit 80 switches ON and the output current reaches the node 25. This current is shared between the system DC/DC converter 22 and the battery 18. The current flowing to the battery generates a voltage drop across the sense resistor 34, This voltage is amplified by the sense amplifier 64 and is compared with the programmed value IDAC by the error amplifier 58. When the charging current exceeds the programmed value IDAC, the output of the error amplifier 58 goes negative, flows through diode 52, and reduces the duty cycle of the PWM to keep the charging current at the programmed value. Likewise, error amplifier 60 compares the battery voltage with the programmed value VDAC and, when the charging voltage exceeds the programmed value VDAC, the duty cycle of the buck converter is decreased. Similarly, the total output current of the buck converter generates a voltage drop on the sense resistor 26. This voltage drop is amplified by the sense amplifier 62 and compared with the preset value Iout_max by the error amplifier 56. When the total output current exceeds the preset value, the output of the error amplifier 56 goes negative, the signal flows through diode 50, and the duty cycle is reduced as to keep the total output current at the preset limit. This decrease produces a drop of the battery charging current. As it is known, because of the battery's low internal resistance, the battery charging current decreases very quickly with the reduction of the voltage. Conversely, the current sunk by the system DC/DC converter 22 is only marginally affected by this voltage variation. Thus, the total current $I_{TOT}$ at node 25 is kept constant while the battery charging current decreases. Thus, the current allocated to the system DC/DC converter 22 is increased. Up to a preset limit, the whole output current of the buck converter is allocated to the system 24. Furthermore, if the system requests more power, the voltage will drop even more and the battery will join the buck converter in providing the power. This features allows to use smaller and cheaper input power adapters.

Signals VDAC and IDAC are programmed signals that represent the maximum current and voltage that can be delivered safely to the battery 18, i.e., the threshold values permitted by the battery for safe operation. In some instances, battery 18 supplies signals VDAC and IDAC (i.e., if battery 18 is a so-called "smart battery" that supplies signals indicative of its maximum allowable power), which could be in digital form. Thus, D/A converters (not shown) are provided to convert VDAC and IDAC into analog signals for comparison at error amplifiers 60 and 59, respectively, as described above. Alteratively, VDAC and IDAC can be generated by other programmable circuitry (not shown), as is known in the art. In addition, reference signal Iout_max is another preset threshold value that represents the maximum allowable current that PWM is permitted to deliver to prevent overcurrent from being delivered by the charger circuit 32. Iout_max can be generated by a voltage divider circuit (not shown) or other current generating circuits known in the art.

It should be noted that, in this embodiment, diode 12 is preferably replaced with circuit 80. Both diode 12 (FIG. 3) and circuit 80 prevent reverse current from reaching the PWM coming from the battery 18. However, circuit 80 has the additional advantage over a diode in that a negligible forward voltage is needed to turn ON circuit 80. Consequently, circuit 80 has a very small voltage drop compared to a diode, and thus, circuit 80 creates a negligible loss ill the system. Circuit 80 carries out the task of cutting out the reverse current from the battery to the charger. Circuit 80 includes a MOS transistor 70 embedding the body diode 72. The MOS transistor 70 is driven by the comparator 66. The comparator 66 is designed to have a definitely positive offset, as provided by bias source 68. As long as the voltage on the MOS drain is negative with the respect to its source, the output of the comparator 66 goes high and the MOS transistor 70 turns OFF. When the MOS drain voltage exceeds the offset, the output of the comparator 66 goes low and the MOS transistor 70 turns ON. As the result, the circuit 80 behaves like a diode with very low forward voltage drop.

The power supply system shown in FIG. 4 limits the total output current of the buck converter, Since the buck converter output voltage depends on the battery voltage, in the case of a fully discharged battery, this output current limiting method forces the buck converter to deliver a lower power than its rating. Accordingly, another solution is to control and to limit the buck converter output power, in addition to control of the parameters shown in FIG. 4.

Figure 5:
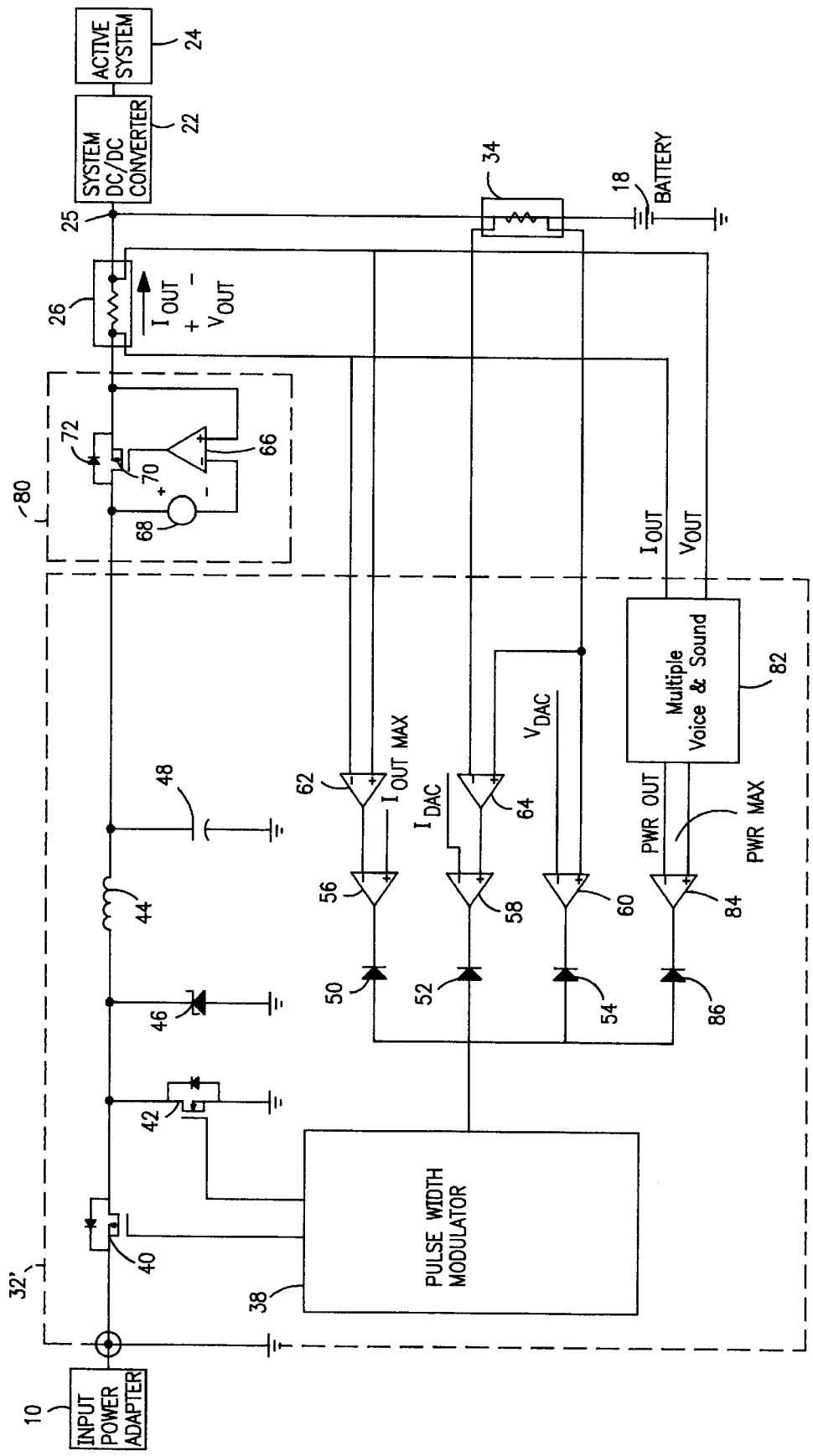
FIG. 5 is a detailed circuit diagram of another embodiment of the power supply system of the present invention.

FIG. 5 shows a system 32' similar to the one in FIG. 4, but with an additional power limiting loop. The voltage drop across the sense resistor 26, proportional to the total output current $I_{OUT}$, is applied both to the output current sense amplifier 62 and to the multiplier 82. Through the second connection to the multiplier senses also the output voltage $V_{OUT}$. By multiplying the total output current value by the output voltage value, the multiplier 82 provides at its output a voltage PWR_OUT proportional to the output power. As for the other loops, the PAR_OUT voltage is compared by the comparator 84 with the set limit. The amplified error drives the Pulse Width Modulator 38, through the diode 86. The function of this diode is similar with the one of the other diodes 20, 52, 54, as described above in reference to FIG. 4.

Figure 6:
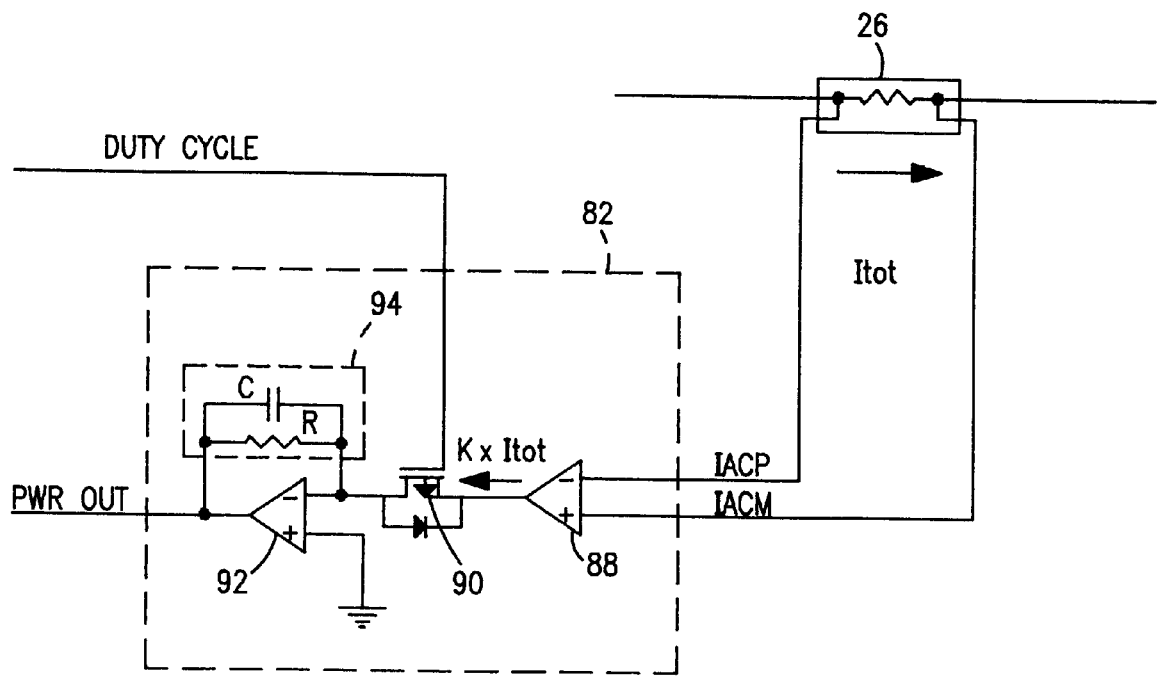
FIG. 6 is a detailed circuit diagram of one example of a current-voltage multiplying circuit provided in the embodiment of FIG. 5.

An illustrative circuit 82 for multiplying the buck converter output current and voltage values is shown in FIG. 6. The voltage drop across the sense resistor 26 is applied to the transconductance amplifier 88. This provides a current, $K \times I_{OUT}$, which is proportional with the voltage drop, therefore with the total output current. The MOS transistor 90 chops this current by the same duty cycle as the buck converter. To that end, the duty signal is supplied to the control line of transistor 90. The resulting current is integrated by the integrating circuit built around the operational amplifier 92 using the integrative RC group 94. The integrator 92 output voltage will be proportional with the total output power of the buck converter.

Figure 7:
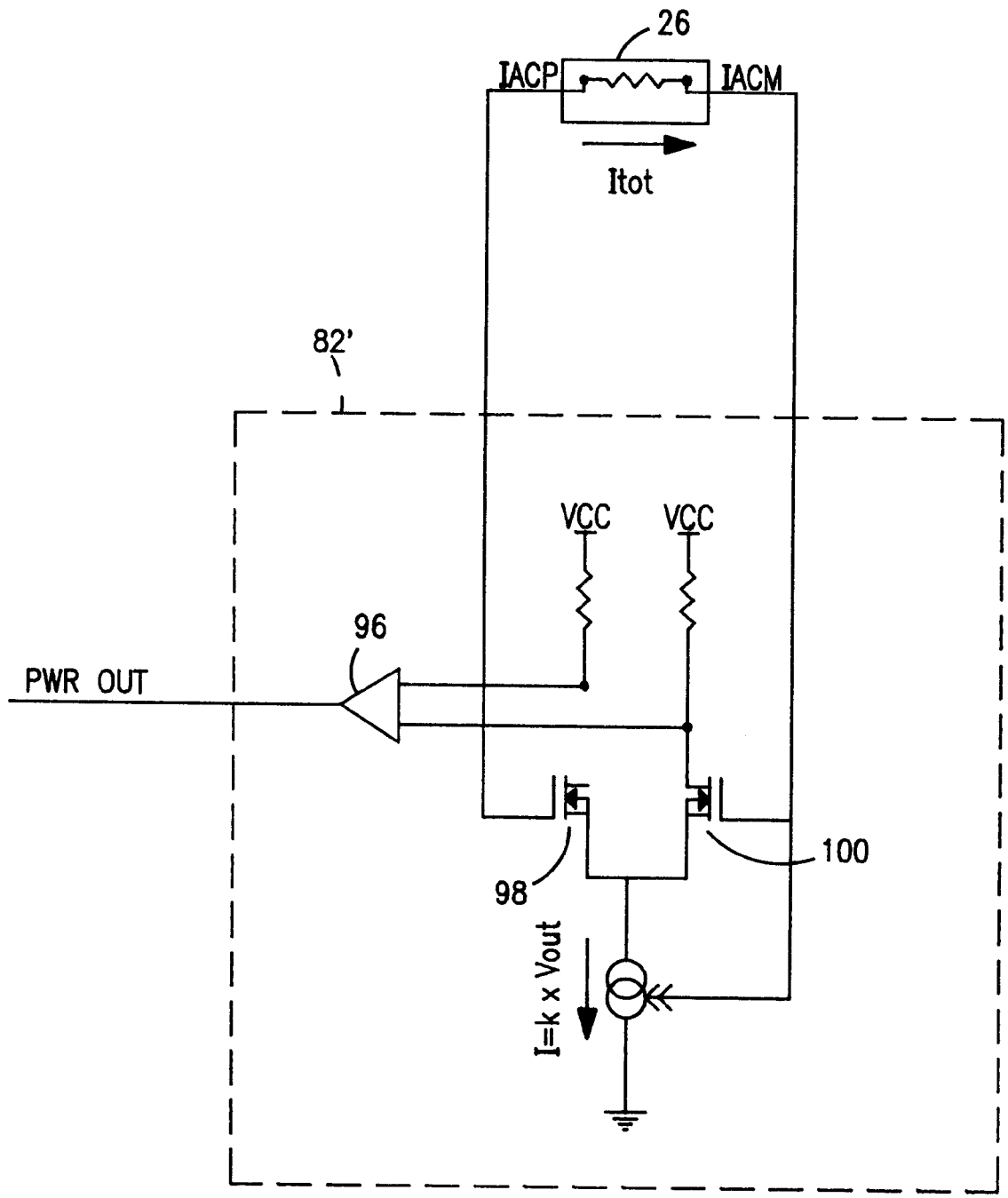
FIG. 7 is a detailed circuit diagram of another example of a current-voltage multiplying circuit provided in the embodiment of FIG. 5.

Another illustrative circuit 82' for multiplying the output current and the output voltage values is shown in the FIG. 7. This circuit is based on a well-known property of an amplifying differential stage. The output voltage of such a stage is roughly proportional to the product of the common source current, $I = k \times V_{OUT}$, and the differential input voltage. The differential amplifier stage shown in the FIG. 7 includes common-source transistors 98 and 100 each tied to reference voltage $V_{CC}$. The differential input is connected to the total current sense resistor 26. Therefore, the output voltage, provided by amplifier 96, will be proportional to the buck converter output power.

Thus, it is apparent that there has been provided a buffer battery power supply circuit that satisfies the objectives set forth herein. Those skilled in the art will recognize that the present invention is subject to modification and/or alterations, all of which are deemed within the scope of the present invention, as defined in the appending claims.

For example, although the preferred embodiments shown in FIG. 4 and 5 specifically mention the use of a controlled buck converter circuit, those skilled in the art will recognize that the buck converter circuit can be replaced with other controllable power supplies known in the art, including, for example, boost, buck-boost, and other similar circuit topologies. Such topologies may also be derived from frequency width modulation (FWM) circuitry and or other switching topologies.

Other modifications are possible. For example, the diodes 50, 52, 54, and 56 can equally be replaced with other reverse bias switches known in the art, including for example, biased transistor circuits.

What is claimed is:

1. A power supply systems comprising a charger circuit for generating a duty cycle for delivering power to an active system and a battery; a first feedback loop to sense the total output current generated by the charger circuit and a second feedback loop to sense the current delivered to said battery by said charger circuit; said first and second feedback loops including error circuits for generating an error signal to said charger circuit, wherein said charger circuit adjusting said duty cycle for adjusting the total output current delivered to the active system and the battery based on the value of said error signal.

2. A power supply system as claimed in claim 1, flier comprising an input power source connected to said charger circuit.

3. A power supply system as claimed in claim 2, wherein said charger circuit including a pulse width modulator (PWM) circuit connected to said input power source, said PWM providing said duty cycle to regulate said input power source based on said error signals supplied by said first and second feedback loops.

4. A power supply system as claimed in claim 1, wherein said charger circuit, said active system and said battery being connected in parallel.

5. A power supply system as claimed in claim 1, wherein said first feedback loop comprising a sense resistor for sensing a total output current signal delivered to said active system, a first sense amplifier for amplifying said total output current signal, a first comparator for comparing said amplified total output current signal with a predetermined total output current threshold value to generate a first error signal, and a first switch for permitting said first error signal to flow to said charger circuit; said second feedback loop comprising a second sense resistor for sensing the current signal delivered to said battery, a second sense amplifier for amplifying said current signal delivered to said battery, a second comparator for comparing said amplified current signal delivered to said battery with a predetermined battery current threshold value to generate a second error signal, and a second switch for permitting said second error signal to flow to said charger circuit; wherein said first and second switches being connected in parallel and wherein the largest of said first and second error signals being permitted to flow through said first and second switches as said error signal supplied to said charger circuit.

6. A power supply system as claimed in claim 5, and further comprising a third feedback loop comprising a third comparator for comparing a battery voltage with a predetermined battery voltage threshold signal to generate a third error signal, and a third switch for permitting said third error signal to flow to said charger circuit; wherein said first, second and third switches being connected in parallel and wherein the largest of said first, second and third error signals being permitted to flow through said first, second and third switches as said error signal supplied to said charger circuit.

7. A power supply system as claimed in claim 6, wherein said predetermined total output current threshold value and said predetermined battery voltage threshold signal being generated by a voltage divider circuit dividing the total output voltage and the voltage across said battery.

8. A power supply system as claimed in claim 5, wherein said predetermined total output current threshold value and said predetermined battery voltage threshold signal being generated by a programmable circuit.

9. A power supply system as claimed in claim 5, further comprising a power limiting feedback loop comprising a multiplier circuit for multiplying said total output current with a total output voltage to generate a total output power signal, a power comparator for comparing said total output power signal to a predetermined power output threshold signal to generate a power output error signal, and a power switch for permitting said power output error signal to flow to said charger circuit; wherein said first, second and power switches being connected in parallel and wherein the largest of said first, second and power error signals being permitted to flow through said first, second and power switches as said error signal supplied to said charger circuit.

10. A power supply system as claimed in claim 9, wherein said multiplier circuit comprises a transconductance amplifier for generating a total current signal, a transistor having said duty cycle as control line input from said charger circuit and for chopping said total current signal in accordance with said duty cycle for multiplying said total output current with said output voltage to generate a power current signal proportional to said total output power and an integrating circuit for generating an output voltage signal proportional to said total output power.

11. A power supply system as claimed in claim 9, wherein said multiplier circuit comprises a differential amplifier circuit for generating an output voltage proportional to said total output power.

12. A power supply system as claimed in claim 1, further comprising a dc-dc converter circuit for receiving said output current delivered by said charger circuit and delivering power to said active system.

13. A power supply system as claimed in claim 1, further comprising a reverse current limiting circuit for limiting current from flowing from said battery to said charger circuit.

14. A power supply system as claimed in claim 13, wherein said reverse current limiting circuit comprises a diode having a forward bias in the direction of said total output current.

15. A power supply system as claimed in claim 13, wherein said reverse current limiting circuit comprises a transistor, a comparator connected to the input and output lines of said transistor and for generating a control signal connected to the control line of said transistor, and a voltage source for biasing said transistor in a positive manner; wherein said transistor conducting when a current flows from said input to said output.

16. A power supply system comprising, an input power source, a charger circuit for generating a duty cycle for controlling said input power source to deliver controlled power to an active system and a battery; a first feedback loop to sense the total output current generated by the charger circuit, said first feedback loop generating a first error signal based on said total output current and a preset threshold total output current signal; a second feedback loop to sense the current delivered to said battery by said charger circuit, said second feedback loop generating a second error signal based on said current delivered to said battery and a preset threshold battery current signal; and a third feedback loop for sensing the total output power generated by said charger circuit, said third feedback loop generating a third error signal based on said total output power and a preset threshold total output power signal, wherein said charger circuit adjusting said duty cycle for adjusting the total output current and power delivered to the active system and the battery based on the value of said first, second or third error signal.

17. A power supply system as claimed in claim 16, and further comprising a fourth feedback loop to sense the voltage delivered to said battery, said fourth feedback loop generating a fourth error signal based on said voltage delivered to said battery and a preset threshold battery voltage signal; wherein said charger circuit adjusting said duty cycle for adjusting the total output current and power delivered to the active system and the battery based on the value of said first, second, third or fourth error signal.

18. A power supply system as claimed in claim 16, wherein said first feedback loop includes a first comparator for comparing said total output current and said preset threshold total output current signal; said second feedback loop including a second comparator for comparing said current delivered to said battery and said preset threshold battery current signal; said third feedback loop including a third comparator for comparing said total output power and said preset threshold total output power signal; each said first second and third comparators generating said first second and third error signals, respectively.

19. A power supply system as claimed in claim 18, wherein said third feedback loop further comprising a multiplier circuit for multiplying said total output current and a total output voltage and generating a signal proportional to the total output power.

20. A power supply system as claimed in claim 16, wherein said first, second and third error signals being supplied to a switch, wherein said switch conducts based on the largest one of sad first, second or third error signals.

21. A power supply system as claimed in claim 16, wherein said charger circuit including a pulse width modulator (PWM) circuit connected to said input power source and generating said duty cycle based on said first, second or third error signals.

22. A power supply system as claimed in claim 16, further comprising a reverse current limiting circuit for limiting current from flowing from said battery to said charger circuit, wherein said reverse current limiting circuit comprises a transistor, a comparator connected to the input and output lines of said transistor and for generating a control signal connected to the control line of said transistor, and a voltage source for biasing said transistor in a positive manner; wherein said transistor conducting when a current flows from said input to said output.

23. A method of regulating the current delivered by a charger circuit to an active system and a battery, said method comprising the steps of:

sensing a first error signal based on the total output current of said charger circuit and a preset threshold total output current signal;

sensing a second error signal based on the current delivered to said battery by said charger circuit and a preset threshold battery current signal; and providing one of said first or second error signals to said charger circuit as feedback signals, and adjusting the current delivered by said charger circuit based on said first or second feedback error signals.

24. A method as claimed in claim 23, further comprising the step of:

sensing a third error signal based on said total output current and a total output voltage of said charger circuit and providing one of said first, second or third error signals to said charger circuit as feedback signals, and adjusting the current and/or voltage delivered by said charger circuit based on said first, second or third feedback error signals.

25. A method as claimed in claim 24, further comprising the step of:

multiplying said total output current and said total output voltage of said charger circuit to generate said third error signal, said third error signal being proportional to the total output power of said charger circuit.

26. A method as claimed in claim 23, further comprising the step of:

sensing a fourth error signal based on a voltage delivered to said battery by said charger circuit and a preset threshold battery voltage signal and providing one of said first second or fourth or signals to said charger circuit as feedback signals, and adjusting the current and/or voltage delivered by said charger circuit based on said first, second or fourth feedback error signals.

27. A method as claimed in claim 23, further comprising the step of:

limiting a reverse current coining from said battery and flowing to said charger circuit.

28. A method as claimed in claim 23, further comprising the step of:

amplifying said total output current and comparing said total output current to said preset threshold total output current signal to generate said first error signal; and amplifying said current delivered to said battery by said charger circuit and comparing said current delivered to said battery to said preset threshold battery current signal to generate said second error signal.

* * * * *

UNITED STATES PATENT AND TRADEMARK OFFICE
CERTIFICATE OF CORRECTION

PATENT NO. : 6,246,215 B1  Page 1 of 1
DATED : June 12, 2001
INVENTOR(S) : Popescu-Stanesti It is certified that error appears in the above-identified patent and that said Letters Patent is hereby corrected as shown below:

<u>Drawings,</u>
In Fig. 5, box 82 should read -- Multiplier Vout x Iout --.

Signed and Sealed this

Fourteenth Day of May, 2002

*Attest:*

JAMES E. ROGAN
*Attesting Officer*   *Director of the United States Patent and Trademark Office*